United States Patent
Luo et al.

(12) 
(10) Patent No.: US 6,287,692 B1
(45) Date of Patent: Sep. 11, 2001

(54) MELT-PROCESSABLE, CROSSLINKABLE COATING COMPOSITIONS

(75) Inventors: Jiazhong Luo, Greenfield; Anthony E. Listro, South Deerfield, both of MA (US)

(73) Assignee: Judd Wire, Inc., Turners Falls, MA (US)

( * ) Notice: Subject to any disclaimer, the term of this patent is extended or adjusted under 35 U.S.C. 154(b) by 0 days.

(21) Appl. No.: 09/330,758

(22) Filed: Jun. 11, 1999

(51) Int. Cl.7 .............................. B32B 15/00; H01B 7/00; C08F 8/00
(52) U.S. Cl. ................. 428/379; 428/375; 174/110 PM; 525/191; 525/222; 525/227; 525/240
(58) Field of Search ..................................... 428/379, 375; 174/110 PM; 525/191, 222, 227, 240

(56) References Cited

U.S. PATENT DOCUMENTS

| | | |
|---|---|---|
| 4,206,260 | 6/1980 | McMahon . |
| 4,255,303 | 3/1981 | Keogh . |
| 4,451,536 | 5/1984 | Barlow et al. . |
| 4,468,435 | 8/1984 | Shimba et al. . |
| 4,533,602 | 8/1985 | Nakamura et al. . |
| 4,574,111 | 3/1986 | Henkel et al. . |
| 4,581,290 | 4/1986 | Henkel et al. . |
| 4,857,673 | 8/1989 | Wilkus et al. . |
| 5,124,206 | 6/1992 | Matsubard et al. . |
| 5,256,482 | 10/1993 | Yamanouchi et al. . |
| 5,378,539 | 1/1995 | Chen . |
| 5,418,272 | 5/1995 | Kawabata et al. . |
| 5,470,657 | 11/1995 | Hayami . |
| 5,576,401 | 11/1996 | Steiger et al. . |
| 5,650,205 | 7/1997 | Shukushima . |

FOREIGN PATENT DOCUMENTS

| | | |
|---|---|---|
| 0 166 781 A1 | 1/1986 | (EP) . |
| 0 632 067 A2 | 1/1995 | (EP) . |
| 2 016 016 A | 9/1979 | (GP) . |

OTHER PUBLICATIONS

Ray & D. Khastgir, Low–Density Polyethylen (LDPE) and Ethylene Vinyl Acetate (EVA) Copolymer blends as Cable Insulants, Plastics, Rubber and Composites Processing and Applications, vol. 22, No. 1 (1994), at 37–45.

*Primary Examiner*—Cynthia H. Kelly
*Assistant Examiner*—J. M. Gray
(74) *Attorney, Agent, or Firm*—Mary R. Bonzagni, Esq.; Holland & Bonzagni, P.C.

(57) ABSTRACT

A crosslinked coating composition that demonstrates excellent resistance to fuel, flame and high temperature in addition to good mechanical properties including high flexibility, high elongation and tensile strength, abrasion and pinch resistance is provided. The composition is based on a blend of HDPE homopolymers and high-VA-content EVA copolymers and is useful as an insulating material for wires or cables used in automotive gas-tank passthrough applications.

8 Claims, No Drawings

MELT-PROCESSABLE, CROSSLINKABLE COATING COMPOSITIONS

FIELD OF THE INVENTION

The present invention generally relates to melt-processable, crosslinkable coating compositions and, more particularly, relates to blends of high-density polyethylene (HDPE) homopolymers and high ethylene vinyl acetate (EVA) copolymers. The inventive blends are especially useful as insulating coatings for wire and cable used in automotive gas-tank passthrough applications.

BACKGROUND

Polymer based insulating materials for the manufacture of electric wires and cables are known. For example, in I. Ray & D. Khastgir "Low-density polyethylene (LDPE) and ethylene vinyl acetate (EVA) copolymer blends as cable insulants", *Plastics, Rubber and Composites Processing and Applications* 22 (1994) 37–45, a heat-resistant cable insulant demonstrating an optimum balance of properties was sought. Blends of LDPE and EVA copolymers containing 28% vinyl acetate monomer (VA) were studied and the conclusion drawn by the authors that 50/50 LDPE/EVA blends are the best compromise in terms of electrical, thermal and mechanical properties.

In U.S. Pat. No. 5,418,272 to Kawabata et al., the inventors sought to improve conventional flame-retardant resin compositions that employ organic flame retardants. By way of this reference, an abrasion-resistant flame-retardant composition which has improved heat resistance while retaining mechanical strength, flexibility, processability and flame retardancy is provided. The composition of Kawabata et al. comprises:

I. 100 parts by weight of a polymer comprising:
   A) 50–90% by weight, based on the total polymer weight, of a polyolefinic having a maximum peak temperature ($T_m$) of higher than 125° C. as measured by differential scanning calorimetry (DSC) (e.g., HDPE), and
   B) 10–50% by weight, based on the total polymer weight, of a polyethylenic resin or rubber having a maximum peak temperature ($T_m$) of lower than 125° C. as measured by DSC (e.g., ethylene-vinyl ester copolymers); and II. 30–200 parts by weight of an inorganic flame retardant, where the polymer component (I) contains a functional group(s) selected from: a carbonyl group or an anhydride group thereof; an epoxy group; an hydroxyl group; an amino group; an alkenyl cyclic imino ether group; and a silane group. Component A) or B) containing a functional group participate in coupling the polymer component (I) with the inorganic flame retardant.

In U.S. Pat. No. 5,378,539 to Mark C. Chen, the inventor also sought to improve conventional flame-retardant resin compositions that employ halogens in their base resins as flame retardants. What is provided by way of this reference is a flame-retardant composition which is partially crosslinked before melt forming and which employs inorganic fire retardants which retains good mechanical properties and flame retardancy. The flame-retardant composition comprises: a) 50–95 parts of an ethylene copolymer of ethylene and at least one other monomer (e.g.,ethylene vinyl acetate copolymers); b) 5–45 parts of polyethylene provided that when the polyethylene is high density polyethylene (HDPE) or medium density polyethylene (MDPE) it does not exceed 40 wt. % of the combined weight of a) and b); and c) various named additives. This reference teaches away from HDPE levels of >40 wt. % where the elongation of the resulting coating reportedly drops off significantly.

In U.S. Pat. No. 5,256,482 to Yamanouchi et al., the inventors sought to develop a crosslinked polyethylene insulated cable that showed greatly improved resistance to degradation under continuously applied voltage at high temperature for extended periods of time. The crosslinked polyethylene insulating composition that was developed is disclosed as comprising: a) a polyethylene homopolymer having a melt index of 0.5–10; b) >10 to <30% by weight (based on the total weight of a) and b)) of an ethylene vinyl acetate copolymer having a vinyl acetate content of 28 to 33% by weight and a melt index of 0.3 to 100; c) an organic peroxide; and d) optionally, an antioxidant. The amount of EVA having a vinyl acetate content falling within the above-referenced range is identified in this reference as critical.

In U.S. Pat. No. 4,451,536 to Barlow et al., the inventors sought to develop an improved conductive shielding for high voltage cables. Provided by way of this reference is a pliable semi-conductive resin composition which is resistant to heat distortion and which exhibits low electrical resistance. The composition of Barlow et al. comprises: 1) an ethylene-vinyl acetate copolymer containing 7 to 45% vinyl acetate monomer; 2) from about 10 to 45 wt. % of an admixture of linear low density polyethylene and HDPE; 3) a conductive component; and 4) other additives. Barlow et al. teach away from EVA copolymers having >45 wt. % vinyl acetate where such copolymers may be too difficult to compound.

In more challenging environments, the performance requirements placed upon wires or cables are heightened and are often difficult, if not impossible, to completely satisfy. For example, in automotive gas-tank passthrough applications, molded wires and cables that pass through the gas tank and connect with the engine are usually subjected to high temperatures (e.g., 125–145° C.) and aggressive fuels. Long term exposure to high temperatures cause a reduction in the physical and mechanical properties of the insulation material that shields and protects the wires and cables while aggressive fuels have the potential to chemically erode, swell or otherwise degrade these materials. The automotive industry has therefore dictated that wires or cables intended for use in this environment meet certain threshold requirements. These requirements include a low three-dimensional volume swell in a wide range of fuels, an initial tensile strength of at least 10 megapascals (MPa), and an initial % elongation of at least 100.

The above-referenced prior art polymer based insulating materials have proved to be unsuitable for use in automotive gas-tank passthrough applications. In the case where LDPE/EVA blends were used as the polymer matrix, the resulting insulating materials showed high to very high swelling in fuels. Insulating materials prepared from HDPE/low-VA-content EVA copolymer blends showed low elongation and/or high swelling in fuels.

It is therefore an object of the present invention to provide an insulated wire or able for use in automotive gas-tank passthrough applications capable of satisfying the rigid performance requirements set by the automotive industry.

It is a more particular object to provide a crosslinked coating composition that demonstrates excellent resistance to fuel and high temperature in addition to good mechanical properties including high elongation and tensile strength.

It is an even more particular object to provide a crosslinked coating composition that also demonstrates excellent flame resistance, high flexibility, abrasion and pinch resistance.

It is a further object to provide a melt-processable, crosslinkable blend of seemingly incompatible materials for use as an insulating coating for wires and cables to be subjected to challenging or aggressive environments.

SUMMARY

The present invention therefore provides a crosslinked coating composition which comprises:

a. a high density polyethylene homopolymer; and b. a minor amount of an ethylene vinyl acetate copolymer having a vinyl acetate content of greater than 33.5% by weight based on the total weight of the copolymer, the composition having a volume swell no greater than:
25% when immersed in Reference Fuel C or CM15;
20% when immersed in Reference Fuel CM20/MTBE; or
7% when immersed in Reference Fuel CM85, at 60±2° C. for 168 hours (ASTM D 471) and having an initial elongation of at least 100% (ASTM D 412).

Reference Fuels C, CM15, CM20/MTBE and CM85 are defined hereinbelow.

The present invention further provides a wire or cable having the above-referenced crosslinked coating composition releaseably adhered thereto that demonstrates excellent resistance to fuel and high temperature in addition to good mechanical properties including high elongation and tensile strength.

The present invention also provides a melt-processable, crosslinkable coating composition which comprises:

a. from about 55 to about 82 parts per hundred resins (phr) of a high density polyethylene homopolymer, and b. from about 45 to about 18 phr of an ethylene vinyl acetate copolymer having a vinyl acetate content of from about 33.5 to about 70% based on the total weight of the copolymer.

The foregoing and other features and advantages of the present invention will become more apparent from the following description.

DETAILED DESCRIPTION OF THE INVENTION

The crosslinked coating compositions of the present invention are useful in a wide variety of applications. For example, in addition to its use as an insulated coating for automotive gas-tank wire and cable, the present inventive coating composition can be used with any wire or cable, tube, sheet, film or the like that is intended for use in an aggressive or otherwise challenging environment.

The high density polyethylenes useful in the melt-processable, crosslinkable coating composition of the present invention generally have a density of at least 0.93 g/cm$^3$ and a melt index of 0.01 to 10 grams per 10 minutes (g/10 min) when measured according to ASTM D1238 at 190° C. with 2.16 kilogram (kg) weight. Suitable high density polyethylenes can be prepared using conventional methods.

In a preferred embodiment, the high density polyethylene has a density of 0.943 g/cm$^3$ and a melt index of 0.7 g/10 min and is obtained from Equistar Chemicals, LP, Houston, Tex. under the trade designation PETROTHENE LR 5900.

The ethylene vinyl acetate copolymers useful in the coating composition of the present invention generally have a melt index of 0.01 to 10 g/10 min and contain greater than 33.5 weight percent of copolymerized vinyl acetate based on the total weight of the copolymer, preferably from about 33.5 to about 70 percent, and most preferably from about 35 to about 50 percent by weight of this monomer.

In a preferred embodiment, the ethylene vinyl acetate copolymer has a vinyl acetate content of 36% and a melt index of 0.9 g/10 min and is obtained from DuPont Co., Polymers, Wilmington, Del. under the trade designation ELVAX 170.

The melt-processable, crosslinkable coating compositions of this invention can contain one or more additives, provided any such additive(s) does not adversely impact upon the desirable properties of the composition. Contemplated additives include accelerators, antiblock agents, antioxidants, colorants, crosslinking promoters, dyes, fillers, flame retardant agents, lubricants, metal deactivators, pigments, plasticizers, processing aids, reinforcing agents, stabilizers, ultraviolet stabilizers and the like.

These additives would be used in amounts designed to provide the intended effect in the resulting composition. Preferably, the total amount of additives is less than or equal to 120 phr. More preferably, the coating composition of the present invention employs: from about 5 to about 80 phr of one or more flame retardant agents; from about 0.2 to about 10 phr of one or more antioxidants; from about 0.1 to about 5 phr of one or more metal deactivators; less than or equal to 10 phr of one or more crosslinking promoters; less than or equal to 20 phr of one or more reinforcing agents; and less than or equal to 2 phr of one or more processing lubricants.

In a preferred embodiment, the melt-processable, crosslinkable coating composition of the present invention comprises:

a. from about 55 to about 82 phr of a high density polyethylene homopolymer; and b. from about 45 to about 18 phr of an ethylene vinyl acetate copolymer having a vinyl acetate content of from about 33.5 to about 70% based on the total weight of the copolymer.

In a more preferred embodiment, the coating composition of the present invention comprises:

a. from about 55 to about 82 phr of a high density polyethylene homopolymer;

b. from about 45 to about 18 phr of an ethylene vinyl acetate copolymer having a vinyl acetate content of from about 33.5 to about 70% based on the total weight of the copolymer; and c. the following per 100 parts of (a) and (b):
(i) from about 5 to about 80 parts of one or more flame retardant agents;
(ii) from about 0.2 to about 10 parts of one or more antioxidants;
(iii) from about 0.1 to about 5 parts of one or more metal deactivators;
(iv) less than or equal to 10 parts of one or more crosslinking promoters;
(v) less than or equal to 20 parts of one or more reinforcing agents; and
(vi) less than or equal to 2 parts of one or more processing lubricants.

The components of the present invention may be admixed and blended together by any of the techniques used in the art to blend and compound thermoplastics to homogeneous masses. In a preferred embodiment, a two-step compounding/extrusion process is used. In particular, continuous compounding is achieved via a multi-port compounding or twin-screw extrusion line. Resins are added by way of an upstream feed port and premixed additives including crosslinking promotors are added via a downstream feed port. Preferred stock temperatures range from about 160 to about 185° C. The resulting compound is pelletized at the end of the compounding line. After drying, the compound is extruded onto a wire or cable, or other substrate. The thickness of the extruded layer is generally from about 0.1 to about 5 millimeters (mm) and preferably from about 0.2 to about 1.5 mm.

Once extruded, the compound is then irradiated to effect crosslinking. The dosage employed in the irradiation step is preferably below 25 megarad (Mrad) so as to minimize or prevent polymer degradation. Suitable dosages are generally in the range of 5 to 25 Mrad. The ionizing radiation can be in the form of accelerated electrons (i.e., high energy electron beam) or gamma rays. Ultraviolet radiation may also be employed.

As alluded to above, the inventive crosslinked material is suitable for use as wire/cable insulation in aggressive environments. This material is especially suitable for use in environments made aggressive at least in part by the presence of fuel and oil ranging from nonpolar paraffinic and aromatic hydrocarbon to polar alcohol-fuel, which are generally used in different automotive gasoline, diesel fuels and aviation fuels.

The crosslinked HDPE/high EVA copolymer insulated wire or cable of the present invention demonstrates excellent fuel resistance to a wide range of polar and nonpolar fuels that include, but are not limited to, paraffinic, aromatic hydrocarbon and alcohol fuels (i.e., alcohol-rich fuels). Tests for determining fuel resistance measure three-dimensional swelling and are conducted on extruded tape samples that have been immersed in a target fuel at 60° C. for 168 hours.

It is noted herein that the Ford Motor Company, by way of its Engineering Material Specification WSG-MIL123-A3, has identified the following "key" property requirements for crosslinked insulation for automotive applications:

|  | Limits |
| --- | --- |
| Fuel Resistance Volume Swelling (%)[1] | |
| Fuel C | +25%, max |
| CM15 | +25%, max |
| CM85 | 7%, max |
| CM20/MTBE | +20%, max |
| Mechanical Properties[2] | |
| Tensile Strength (MPa) | 10 MPa, min |
| Elongation (%) | 100%, min |
| Tensile Strength Retention (%)[3] | 80%, min |
| Elongation Retention (%) | 50%, min |

Reference Fuels C, CM15, CM85 and CM20/MTBE are defined hereinbelow:
[1]ASTM D 471 (60° C. for 168 hours)
[2]ASTM D 412 (strain rate 2 inch/min.)
[3]ASTM D 573 (160° C. for 168 hours)

| Fuels | Compositions |
| --- | --- |
| Fuel C | 50% toluene + 50% isooctane |
| CM15 | 15% methanol + 85% Fuel C |
| CM85 | 85% methanol + 15% Fuel C |
| CM20 | 20% methanol + 80% Fuel C |
| MTBE | methyl tert-butyl ether |
| CM20/MTBE | 15% MTBE + 85% CM20 |

The above-referenced "key" property requirements are met by the present invention. In particular, one dimensional swelling is generally limited to less than or equal to 6% of the original dimension (i.e., length, width or thickness) while total volume swelling generally ranges from about 3 to about 19% of the original volume depending upon the nature of the fuel. It is further noted that after drying the previously immersed test sample at 60° C. for 70 hours, the sample dimension and hardness are kept the same as the original sample (hardness change is less than 1 point, sample dimension is less than 2%).

It is further noted that the inventive crosslinked materials surprisingly demonstrate high elongation. As is well known to those skilled in the art, flame retardant HDPE homopolymer systems demonstrate very low elongation. Moreover, HDPE homopolymers are known to be immiscible with high-VA-content EVA copolymers. Therefore, less than adequate mechanical properties would be expected from such polymer blends.

It is further noted that in a more preferred embodiment, the crosslinked materials of the present invention demonstrate other desirable properties including excellent resistance to flame and high temperatures, high flexibility, tensile strength, abrasion and pinch resistance.

The present invention is described in more detail with reference to the following Examples which are for purposes of illustration only and are not to be understood as indicating or implying any limitation on the broad invention described herein.

WORKING EXAMPLES

Components Used

LDPE: a low density polyethylene having a density of 0.918 g/cm$^3$ and a melt index of 0.25 g/10 min available from Equistar Chemicals, LP under the trade designation PETROTHENE NA 520-024.

HDPE: a high density polyethylene having a density of 0.943 g/cm$^3$ and a melt index of 0.7 g/10 min available from Equistar Chemicals, LP under the trade designation PETROTHENE LR 5900.

EVA (VA 18%): an ethylene vinyl acetate copolymer having a vinyl acetate content of 18% and a melt index of 0.7 g/10 min available from DuPont Co. under the trade designation ELVAX 470.

EVA (VA 28%): an ethylene vinyl acetate copolymer having a vinyl acetate content of 28% and a melt index of 0.5 g/10 min available from DuPont Co. under the trade designation ELVAX CM 576.

EVA (VA 36%): an ethylene vinyl acetate copolymer having a vinyl acetate content of 36% and a melt index of 0.9 g/10 min available from DuPont Co. under the trade designation ELVAX 170.

EVA (VA 50%): an ethylene vinyl acetate copolymer having a vinyl acetate content of 50% and a Mooney viscosity ML (1+4) 100° C.: 27 (ASTM D 1646) available from Bayer Corporation, Akron, Ohio under the trade designation LEVAPREN 500 HV.

EVA-I (VA 70%): an ethylene vinyl acetate copolymer having a vinyl acetate content of 70% and a Mooney viscosity ML (1+4) 100° C. : 27 (ASTM D 1646) available from Bayer Corporation under the trade designation LEVAPREN 700 HV.

EVA-II (VA 70%): an ethylene vinyl acetate copolymer having a vinyl acetate content of 70% and a Mooney viscosity ML (1+4) 100° C.: 70 (ASTM D 1646) available from Bayer Corporation under the trade designation LEVAPREN KA 8784.

ANTIOXIDANT-I: a hindered phenolic antioxidant available from Ciba-Geigy Corp., Hawthorne, N.Y. under the trade designation IRGANOX 1010.

ANTIOXIDANT-II: zinc 2-mercaptotoluimidazole antioxidant available from R.T. Vanderbilt Company, Inc., Norwalk, Conn. under the trade designation VANOX ZMTI.

LUBRICANT: a stearic acid processing lubricant available from Henkel Corp., Emery Group, Ambler, Pa. under the trade designation EMERSOL 400.

FLAME RETARDANT-I: a zinc borate flame retardant available from U.S. Borax Inc., Valencia, Calif. under the trade designation FIREBRAKE ZB.

ACCELERATOR: a high purity French Process zinc oxide available from Zinc Corporation of America, Monaca, Pa. under the trade designation KADOX 920.

FLAME RETARDANT-II: an antimony trioxide flame retardant available from Anzon Inc., Philadelphia, Pa. under the trade designation ANZON TMS.

FLAME RETARDANT-III: a brominated flame retardant available from Albemarle Corp., Baton Rouge, La. under the trade designation SAYTEX BT-93W.

FILLER: silica reinforcing filler available from Degussa Corp., Ridgefield Park, N.J. under the trade designation AEROSIL 200VS.

ANTIOXIDANT-III: a hindered phenolic antioxidant metal deactivator available from Ciba-Geigy Corp. under the trade designation IRGANOX MD-1024.

CROSSLINKING PROMOTER: a trimethylolpropane trimethacrylate crosslinking promoter available from Sartomer Company, Exton, Pa. under the trade designation SR-350.

Sample Preparation and Test Methods

Crosslinked polyethylene tapes were prepared using the compositions shown in the following tables. In particular, all of the additives in the form of powders (except the CROSSLINKING PROMOTER) were mixed together. The two resin components in the form of pellets were mixed together separately. Compounding was conducted in a Banbury mixer. In particular, after the stock temperature reached 165° C., the resin mixture was added to the activated or running mixer. Five to seven minutes later, the additive mixture was added to the now molten polymer and mixed. Two to three minutes later, the CROSSLINKING PROMOTER was added to the mixture to make the final compound. The polymer melt temperature during processing was around 132° C. The hot compound was then calendered and pelletized. A Brabender extruder was then used to extrude tapes. Extrusion temperatures were between 180–190° C. The thickness of the extruded tapes was 1–3mm.

The tapes were then irradiated using electron-beam radiation. Irradiation was conducted at 1 Mrad per pass under the condition of air-cooling. At a half-way point (i.e., 5 Mrad) the tape samples were flipped around or reversed. Total dosage was 10 Mrad.

The crosslinked tape samples were then subjected to the following tests:

Fuel Resistance fuel resistance was measured in terms of volume swelling or percentage of volume increase of a crosslinked tape sample upon immersion in a target fuel. Volume swelling was determined in accordance with the test procedure set forth in ASTM D 471. In particular, crosslinked tape samples were cut to a rectangular shape measuring 1"×2" and then the length, width and thickness of each cut sample measured at three separate locations along its length using an electronic digital caliper. The hardness of each sample was also measured at this time using a Shore D Durometer in accordance with ASTM D 2240. Four two-neck flasks containing one of the above-referenced fuels (i.e., Fuel C, CM15, CM85 and CM20/MTBE) were provided and equipped with a water-cooled condenser and a thermometer. A heater having a built-in controller was used to adjust and maintain the fuel temperature in each flask at 60° C.

Four identical crosslinked tape samples from each set tested were separately placed in the flasks and kept immersed in the fuel contained in the flask for 168 hours. Each sample was then transferred to a separate flask containing a cool test liquid at room temperature for 30 to 60 minutes. The cooled test sample was then dipped in acetone and blotted lightly with soft paper and the dimensions measured within 30 seconds. The hardness was then measured, and compared to the original hardness before immersion. The samples were then transferred into an oven maintained at 60° C. and dried for 70 hours. The dimensions and hardness of each sample was then measured and the samples allowed to cool to room temperature. The test was then repeated for each set of samples. Volume swelling was determined by calculating the volume of each test sample before and after immersion and then by calculating the percent increase in volume.

Tensile Strength (MPa)

Samples were tested in accordance with the procedure described in ASTM D 412 using a strain rate of 2 inch/min.

Elongation (%)

Samples were also tested in accordance with the procedure described in ASTM D 412 using a strain rate of 2 inch/min.

Heat Aging

Heat aging or high-temperature resistance was measured in terms of percent retention of tensile strength and % elongation in accordance with the test procedure detailed in ASTM D 573 with the exception that a temperature of 160° C. was employed. Testing was conducted in a type II mechanical convection oven maintained at 160° C. Three identical die-cut test samples from each set of six samples was tested for initial tensile strength and % elongation in accordance with ASTM D 412. The remaining three test samples from each set were then heat aged by vertically suspending the samples in the oven without any weight load (also without touching each other) for 168 hours. The aged samples were then cooled to room temperature. The tensile strength and % elongation of the heat aged test samples were then determined and compared to the initial values for the purpose of calculating percent retention of tensile strength and % elongation.

Working Examples 1 to 5

In Examples 1 to 5, tape samples comprising either LDPE or HDPE and EVA(VA36%) were prepared and tested and the results tabulated in Table I hereinbelow.

TABLE I

SUMMARY OF EXAMPLES 1 TO 5

| EXAMPLES | 1 | 2 | 3 | 4 | 5 |
|---|---|---|---|---|---|
| Components (phr by weight) | | | | | |
| LDPE | 70.00 | 0 | 60.00 | 0 | 0 |
| HDPE | 0 | 70.00 | 0 | 60.00 | 100 |
| EVA (VA 36%) | 30.00 | 30.00 | 40.00 | 40.00 | 0.0 |
| ANTIOXIDANT-I | 1.00 | 1.00 | 1.00 | 1.00 | 1.00 |
| ANTIOXIDANT-II | 2.00 | 2.00 | 2.00 | 2.00 | 2.00 |
| LUBRICANT | 0.45 | 0.45 | 0.45 | 0.45 | 0.45 |
| FLAME RETARDANT-I | 5.00 | 5.00 | 5.00 | 5.00 | 5.00 |
| ACCELERATOR | 5.00 | 5.00 | 5.00 | 5.00 | 5.00 |
| FLAME RETARDANT-II | 8.00 | 8.00 | 8.00 | 8.00 | 8.00 |
| FLAME RETARDANT-III | 24.00 | 24.00 | 24.00 | 24.00 | 24.0 |
| FILLER | 7.00 | 7.00 | 7.00 | 7.00 | 7.00 |
| ANTIOXIDANT-III | 0.50 | 0.50 | 0.50 | 0.50 | 0.50 |
| CROSSLINKING PROMOTER | 7.50 | 7.50 | 7.50 | 7.50 | 7.50 |
| Fuel Resistance Volume Swelling (%) | | | | | |
| FUEL C | 63.7 | 19.0 | 65.7 | 19.0 | −0.8 |
| CM15 | 53.3 | 18.7 | 38.2 | 21.0 | 2.4 |
| CM85 | 10.4 | 2.8 | 8.6 | −0.6 | −4.1 |
| CM20/MTBE | 40.1 | 8.3 | 35.1 | 20.0 | −4.2 |
| Mechanical Properties | | | | | |
| Tensile Strength (MPa) | 15.8 | 20.4 | 18.5 | 17.2 | 19.0 |
| Elongation (%) | 238 | 333 | 246 | 278 | 20 |

Working Examples 2 and 4 demonstrate the remarkable fuel resistance, significant initial elongation and good tensile strength achieved by the seemingly incompatible crosslinked blends of the present invention while Examples 1, 3 and 5 serve to demonstrate the inability of crosslinked LDPE/EVA(VA36%) blends and HDPE homopolymers to achieve these target properties.

Working Examples 6 to 11

In Examples 6 to 11, tape samples comprising HDPE and EVA copolymers having varying amounts of VA monomer were prepared and tested and the results tabulated in Table II hereinbelow.

TABLE II

SUMMARY OF EXAMPLES 6 TO 11

| EXAMPLES | 6 | 7 | 8 | 9 | 10 | 11 |
|---|---|---|---|---|---|---|
| Components (phr by weight) | | | | | | |
| HDPE | 70.00 | 70.00 | 70.00 | 70.0 | 70.00 | 70.0 |
| EVA (VA 18%) | 30.00 | 0 | 0 | 0 | 0 | 0 |
| EVA (VA 28%) | 0 | 30.00 | 0 | 0 | 0 | 0 |
| EVA (VA 36%) | 0 | 0 | 30.00 | 0 | 0 | 0 |
| EVA (VA 50%) | 0 | 0 | 0 | 30.0 | 0 | 0 |
| EVA-I (VA 70%) | 0 | 0 | 0 | 0 | 30.00 | 0 |
| EVA-II (VA 70%) | 0 | 0 | 0 | 0 | 0 | 30.0 |
| ANTIOXIDANT-I | 1.00 | 1.00 | 1.00 | 1.00 | 1.00 | 1.00 |
| ANTIOXIDANT-II | 2.00 | 2.00 | 2.00 | 2.00 | 2.00 | 2.00 |
| LUBRICANT | 0.45 | 0.45 | 0.45 | 0.45 | 0.45 | 0.45 |
| FLAME RETARDANT-I | 5.00 | 5.00 | 5.00 | 5.00 | 5.00 | 5.00 |
| ACCELERATOR | 5.00 | 5.00 | 5.00 | 5.00 | 5.00 | 5.00 |
| FLAME RETARDANT-II | 8.00 | 8.00 | 8.00 | 8.00 | 8.00 | 8.00 |
| FLAME RETARDANT-III | 24.00 | 24.0 | 24.0 | 24.0 | 24.0 | 24.0 |
| FILLER | 7.00 | 7.00 | 7.00 | 7.00 | 7.00 | 7.00 |
| ANTIOXIDANT-III | 0.50 | 0.50 | 0.50 | 0.50 | 0.50 | 0.50 |
| CROSSLINKING PROMOTER | 7.50 | 7.50 | 7.50 | 7.50 | 7.50 | 7.50 |
| Fuel Resistance Volume Swelling (%) | | | | | | |
| FUEL C | 35.2 | 33.9 | 19.0 | 19.8 | 16.2 | 11.8 |
| CM15 | 29.6 | 29.8 | 18.7 | 18.5 | 20.6 | 16.3 |
| CM85 | 5.9 | 6.6 | 2.8 | 6.8 | 10.1 | 8.8 |
| CM20/MTBE | 22.6 | 24.9 | 8.3 | 4.9 | 16.4 | 4.6 |
| Mechanical Properties | | | | | | |
| Tensile Strength (MPa) | 16.7 | 16.8 | 20.4 | 16.4 | 15.9 | 14.8 |
| Elongation (%) | 80 | 215 | 333 | 234 | 108 | 39 |

Working Examples 6 to 11 demonstrate that VA monomer levels of between 33.5 and 70% are necessary for the resulting crosslinked blend to achieve a volume swell no greater than 25% and acceptable mechanical properties. In particular, when plotting volume swell v. VA% and extrapolating to the volume swell limit set for the subject fuel it is seen that suitable VA% for each fuel is as follows: >30% for CM20/MTBE; >31% for CM15; >33.5% for Fuel C; and <70% for CM85.

Working Examples 12 to 17

In Examples 12 to 17, tape samples comprising different blend ratios of HDPE/EVA(VA 36%) were prepared and tested and the results tabulated in Table III hereinbelow.

TABLE III

SUMMARY OF EXAMPLES 12 TO 17

| EXAMPLES | 12 | 13 | 14 | 15 | 16 | 17 |
|---|---|---|---|---|---|---|
| Components (phr by weight) | | | | | | |
| HDPE | 100 | 90.00 | 80.0 | 70.00 | 60.00 | 45.0 |
| EVA (VA 36%) | 0 | 10.00 | 20.0 | 30.00 | 40.00 | 55.0 |
| ANTIOXIDANT-I | 1.00 | 1.00 | 1.00 | 1.00 | 1.00 | 1.00 |
| ANTIOXIDANT-II | 2.00 | 2.00 | 2.00 | 2.00 | 2.00 | 2.00 |
| LUBRICANT | 0.45 | 0.45 | 0.45 | 0.45 | 0.45 | 0.45 |
| FLAME RETARDANT-I | 5.00 | 5.00 | 5.00 | 5.00 | 5.00 | 5.00 |
| ACCELERATOR | 5.00 | 5.00 | 5.00 | 5.00 | 5.00 | 5.00 |
| FLAME RETARDANT-II | 8.00 | 8.00 | 8.00 | 8.00 | 8.00 | 8.00 |
| FLAME RETARDANT-III | 24.00 | 24.00 | 24.0 | 24.00 | 24.00 | 24.0 |
| FILLER | 7.00 | 7.00 | 7.00 | 7.00 | 7.00 | 7.00 |
| ANTIOXIDANT-III | 0.50 | 0.50 | 0.50 | 0.50 | 0.50 | 0.50 |
| CROSSLINKING PROMOTER | 7.50 | 7.50 | 7.50 | 7.50 | 7.50 | 7.50 |
| Fuel Resistance Volume Swelling (%) | | | | | | |
| FUEL C | −0.8 | 10.9 | 18.5 | 19.0 | 19.0 | 53.0 |
| CM15 | 2.4 | 9.2 | 16.8 | 18.7 | 21.0 | 46.2 |
| CM85 | −4.1 | 3.5 | 4.7 | 2.8 | −0.6 | 8.4 |
| CM20/MTBE | −4.2 | 11.6 | 13.4 | 8.3 | 20.0 | 48.0 |
| Mechanical Properties | | | | | | |
| Tensile Strength (MPa) | 19.0 | 17.7 | 16.7 | 20.4 | 7.2 | 20.7 |
| Elongation (%) | 20 | 37 | 107 | 333 | 278 | 285 |

Working Examples 12 to 17 demonstrate that the optimum blend ratio for the coating composition of the present invention is 55:45 to 82:18 HDPE:EVA. In particular, when plotting volume swelling and elongation v. EVA content (phr) it is seen that for fuel resistance, EVA content needs to be about ≦45 phr and for elongation (100%, min), EVA content needs to be about ≧18 phr.

Working Examples 18 to 23

In Examples 18 to 23, crosslinked tape test samples prepared in accordance with the teachings of the present invention were heat aged and tested for retention of tensile strength and % elongation. The results are tabulated in Table IV hereinbelow.

TABLE IV

SUMMARY OF EXAMPLES 18 TO 23

| EXAMPLES | 18 | 19 | 20 | 21 | 22 | 23 |
|---|---|---|---|---|---|---|
| Components (phr by weight) | | | | | | |
| HDPE | 60.0 | 80.0 | 70.00 | 70.0 | 70.0 | 70.0 |
| EVA (VA 28%) | 0 | 0 | 30.00 | 0 | 0 | 0 |
| EVA (VA 36%) | 40.0 | 20.0 | 0 | 30.0 | 0 | 0 |
| EVA (VA 50%) | 0 | 0 | 0 | 0 | 30.0 | 0 |
| EVA-I (VA 70%) | 0 | 0 | 0 | 0 | 0 | 30.0 |
| ANTIOXIDANT-I | 1.00 | 1.00 | 1.00 | 1.00 | 1.00 | 1.00 |
| ANTIOXIDANT-II | 2.00 | 2.00 | 2.00 | 2.00 | 2.00 | 2.00 |
| LUBRICANT | 0.45 | 0.45 | 0.45 | 0.45 | 0.45 | 0.45 |
| FLAME RETARDANT-I | 5.00 | 5.00 | 5.00 | 5.00 | 5.00 | 5.00 |
| ACCELERATOR | 5.00 | 5.00 | 5.00 | 5.00 | 5.00 | 5.00 |
| FLAME RETARDANT-II | 8.00 | 8.00 | 8.00 | 8.00 | 8.00 | 8.00 |
| FLAME RETARDANT-III | 24.0 | 24.0 | 24.0 | 24.0 | 24.0 | 24.0 |
| FILLER | 7.00 | 7.00 | 7.00 | 7.00 | 7.00 | 7.00 |
| ANTIOXIDANT-III | 0.50 | 0.50 | 0.50 | 0.50 | 0.50 | 0.50 |
| CROSSLINKING PROMOTER | 7.50 | 7.50 | 7.50 | 7.50 | 7.50 | 7.50 |

TABLE IV-continued

SUMMARY OF EXAMPLES 18 TO 23

| EXAMPLES | 18 | 19 | 20 | 21 | 22 | 23 |
|---|---|---|---|---|---|---|
| Heat Aging | | | | | | |
| Elongation Retention (%) | 94 | 108 | 102 | 88 | 61 | 81 |
| Tensile Strength Retention (%) | 89 | 94 | 103 | 101 | 98 | 105 |

Working Examples 18 to 23 demonstrate that the crosslinked coating composition of the present invention easily satisfies the minimum mechanical properties dictated by the automotive industry for heat aged wires for automotive gas-tank passthrough applications. In particular, all of the wires tested demonstrated a % tensile strength retention of greater than or equal to 80% and a % elongation retention of greater than or equal to 50%.

Although this invention has been shown and described with respect to detailed embodiments thereof, it would be understood by those skilled in the art that various changes in form and detail thereof may be made without departing from the spirit and scope of the claimed invention.

We claim:

1. A crosslinked coating composition which comprises:
   a. from about 55 to about 82 phr of a high density polyethylene homopolymer; and
   b. from about 45 to about 18 phr of an ethylenevinyl acetate copolymer having a vinyl acetate content of from 35 to about 50% by weight based on the total weight of the copolymer, said composition having a volume swell no greater than:
      25% when immersed in Reference Fuel C or CM15;
      20% when immersed in Reference Fuel CM20/MTBE; or
      7% when immersed in Reference Fuel CM85,
         at 60±2° C. for 168 hours (ASTM D 471) and having an initial elongation of at least 100% (ASTM D 412).

2. The crosslinked coating composition of claim 1, wherein the high density polyethylene homopolymer has a density ranging from about 0.93 to about 0.98 g/cm$^3$ and a melt index ranging from about 0.01 to about 10 g/10 min.

3. The crosslinked coating composition of claim 1, wherein the ethylene vinyl acetate copolymer has a melt index ranging from about 0.01 to about 10 g/10 min.

4. A wire or cable having a crosslinked coating composition releasably adhered thereto, wherein the crosslinked coating composition comprises:
   a. from about 55 to about 82 phr of a high density polyethylene homopolymer, and
   b. from about 45 to about 18 phr of an ethylenevinyl acetate copolymer having a vinyl acetate content of from 35 to about 50% by weight based on the total weight of the copolymer, said composition having a volume swell no greater than:
      25% when immersed in Reference Fuel C or CM15;
      20% when immersed in Reference Fuel CM20/MTBE; or
      7% when immersed in Reference Fuel CM85,
         at 60±2° C. for 168 hours (ASTM D 471) and having an initial elongation of at least 100% (ASTM D 412).

5. The wire or cable of claim 4, wherein the high density polyethylene homopolymer has a density ranging from about 0.93 to about 0.98 g/cm$^3$ and a melt index ranging from about 0.01 to about 10 g/10 min.

6. The wire or cable of claim 4, wherein the ethylene vinyl acetate copolymer has a melt index ranging from about 0.01 to about 10 g/10 min.

7. A crosslinked coating composition which consists essentially of:
   a. a high density polyethylene homopolymer;
   b. a minor amount of an ethylene vinyl acetate copolymer having a vinyl acetate content of from 35 to about 50% by weight based on the total weight of the copolymer; and
   c. the following per 100 parts of (a) and (b):
      (i) from about 5 to about 80 parts of one or more flame retardant agents;
      (ii) from about 0.2 to about 10 parts of one or more antioxidants;
      (iii) from about 0.1 to about 5 parts of one or more metal deactivators;
      (iv) less than or equal to 10 parts of one or more crosslinking promoters;
      (v) less than or equal to 20 parts of one or more reinforcing agents; and
      (vi) less than or equal to 2 parts of one or more processing lubricants.

8. A wire or cable having a crosslinked coating composition releasably adhered thereto, wherein the crosslinked coating composition consists essentially of:
   a. a high density polyethylene homopolymer,
   b. a minor amount of an ethylene vinyl acetate copolymer having a vinyl acetate content of from 35 to about 50% by weight based on the total weight of the copolymer; and
   c. the following per 100 parts of (a) and (b):
      (i) from about 5 to about 80 parts of one or more flame retardant agents;
      (ii) from about 0.2 to about 10 parts of one or more antioxidants;
      (iii) from about 0.1 to about 5 parts of one or more metal deactivators;
      (iv) less than or equal to 10 parts of one or more crosslinking promoters;
      (v) less than or equal to 20 parts of one or more reinforcing agents; and
      (vi) less than or equal to 2 parts of one or more processing lubricants.

* * * * *

UNITED STATES PATENT AND TRADEMARK OFFICE
CERTIFICATE OF CORRECTION

PATENT NO. : 6,287,692 B1
DATED : September 11, 2001
INVENTOR(S) : Luo et al.

It is certified that error appears in the above-identified patent and that said Letters Patent is hereby corrected as shown below:

Column 2,
Line 57, change "able" to -- cable --.

Column 11,
Table III, row "Tensile Strength" under "Example 16", change "7.2" to -- 17.2 --.

Signed and Sealed this

Twenty-sixth Day of February, 2002

Attest:

JAMES E. ROGAN
Attesting Officer   Director of the United States Patent and Trademark Office